July 30, 1968 — L. LEBLANC — 3,394,865

EGG CARTON

Filed May 16, 1966

INVENTOR
Leopold LEBLANC

BY

ATTORNEY

United States Patent Office
3,394,865
Patented July 30, 1968

3,394,865
EGG CARTON
Leopold Leblanc, Victoriaville, Quebec, Canada, assignor of fifty percent to Donald Gregoire, Victoriaville, Quebec, Canada
Filed May 16, 1966, Ser. No. 550,197
5 Claims. (Cl. 229—29)

ABSTRACT OF THE DISCLOSURE

In an egg carton having a plurality of egg receiving compartments, an inverted horseshoe-shaped tearout area for each compartment provided in the lateral wall of the carton, the said area being adapted to be pulled downwardly from the top and to constitute a holding surface for the egg when the latter rolls out of its compartment.

Figure 1:
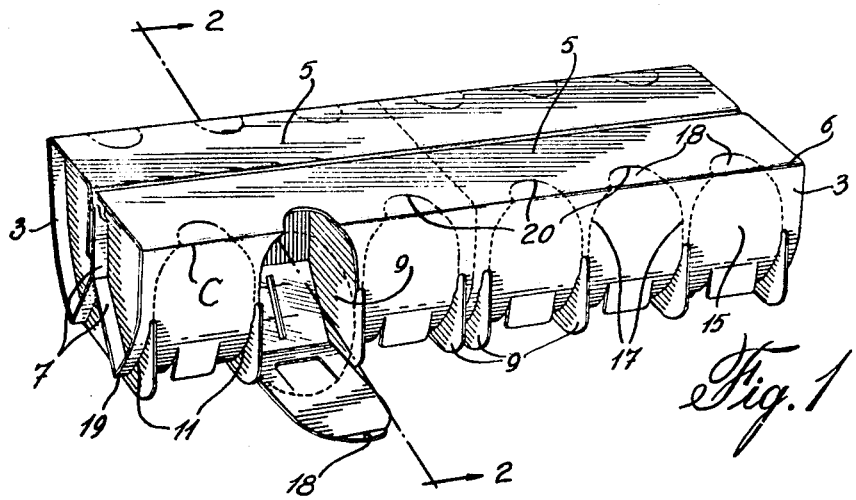

This invention relates to an improvement to egg cartons and more particularly to novel means whereby any egg of the content thereof may be dispensed individually without simultaneous exposure of the remainder of the content.

The majority of the presently used egg packaging cartons have a cover or lid which the consumer must raise or remove to gain access to and remove the content or any fraction thereof; such handling of the rather fragile containers is a hazardous and cumbersome procedure which is rendered even more so by the fact that in many instances cartons are primarily designed for being mechanically formed and closed and will not too readily and conveniently lend themselves to manual handling, particularly of the cover; such maual handling of the cover being somewhat difficult because the designers of the closures of such containers were primarily inspired by the necessity to produce a mechanically manipulatable product and paid little or no attention to the desirability for also achieving an easily manually handled product. Aside from the aforementioned inconveniences of most known egg cartons, there exists at least one other which resides in the difficulty with which the eggs are removed from their individual compartments or cells in the cartons, most cells are square in cross-section, the square having sides equal or slightly less in length than the diameter of the egg it is intended to receive, it follows that in order to remove any egg one must first get a proper hold on the egg itself. This involves blindly inserting the fingers alongside the egg in a space which is hardly large enough, between the egg and the corners of the cell wherein it is lodged, and then tightening the finger grip on the mid section of the egg with the inherent risk of overtightening and thereby breaking the shell of the egg.

It is the object of the present invention to present a carton in which all the aforementioned inconveniences are avoided through the provision, in a lateral wall of each compartment or cell of the carton, of trap means for practicing a convenient dispensing aperture therein; the aperture or trap being defined by a pull-out tab.

The pull-out tab is an integral part of the wall of the cell and may be defined therein by a serrated horseshoe shaped line which extends from a lower corner of the outside wall upwardly along the corresponding corner edge around the upper part of the wall to the other corner edge and then downwardly to terminate at the other lower corner.

The purpose of the invention is therefore to facilitate the removal of the eggs from their individual compartments by providing individual tear-out areas in the side walls of each compartment or cell of the egg carton wherethrough the egg may be delivered by falling naturally into the hand.

An additional object of the present invention is to do away with the aforementioned necessity for getting a firm finger grip on each egg in order to lift it out of its container. The removal of any egg from a carton constructed in accordance with the present invention would only necessitate tearing open the side of the egg compartment and letting the egg roll out by gravity into the palm of the user's hand.

It is also an object of the invention to provide means whereby the covers of the egg cartons may be permanently sealed and remain so even as the eggs contained therein are being taken out of the container one by one.

It is also an important and desirable advantage of the carton according to the present invention that, as the eggs are dispensed therefrom, it is gradually being destroyed thereby making it impossible for anyone thereafter to make further use of the carton.

Additional and more specific objects of the invention and further advantages thereof will become more apparent throughout the detailed description of a preferred embodiment that follows.

Figure 2:
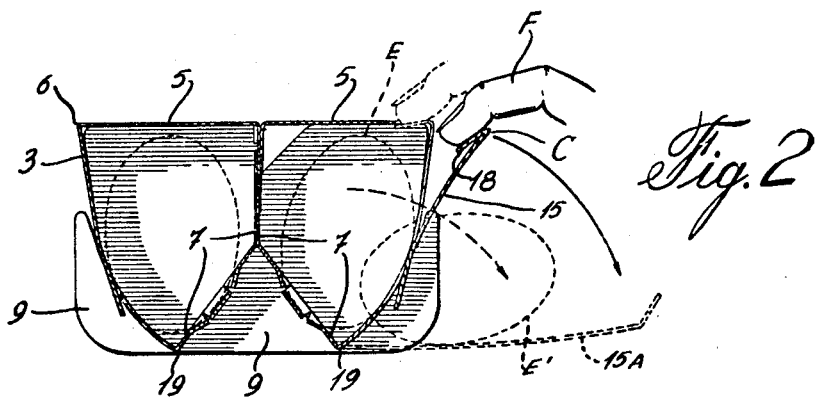
Figure 3:
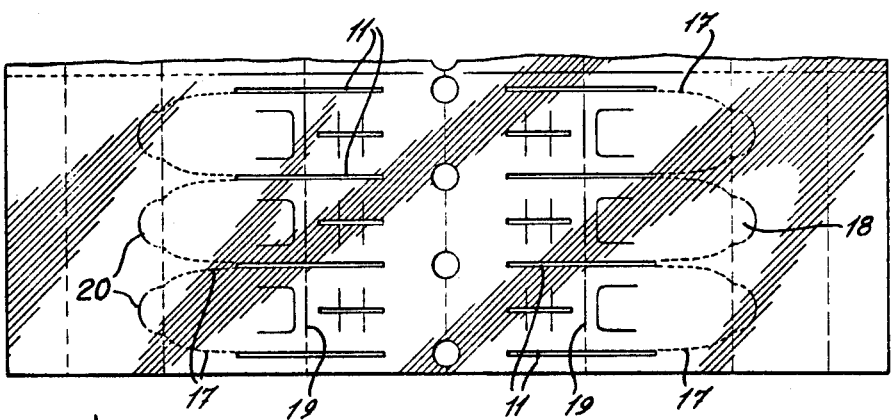

In the drawings:
FIG. 1 is a perspective view of an egg carton constructed in accordance with the invention;
FIG. 2 is a cross-section view taken along line 2—2 of FIG. 1; and
FIG. 3 is a plan view of a portion of the unfolded body of a carton blank embodying the invention.

The shape and structure of the egg carton shown in FIG. 1 is generally representative of the more usual egg cartons found on the market.

It is an elongated container comprising outer side walls 3, cover flaps 5 extending from the upper longitudinal margin 6 of each wall 3, a longitudinal partition wall structure composed of panels 7 and a series of transverse dividing walls 9. The walls 3 and panels 7 are mutually divergent and give rise to essentially V-shaped troughs in which the deposited eggs are separated from one another by the transverse walls 9; the said walls 9 being vertically stabilized by and projecting through slots 11 in the side walls 3.

In the longitudinal walls of each compartment or cell 9 of the carton there is defined, by means of serrated lines 17, an inverted horseshoe shaped tab 15. Each tab 15 is hingedly dependent from the corresponding panel 7 through its connection thereto along the corresponding bottom longitudinal fold line 19.

For easier initiation of the tearing along the serrated lines 17 it is found convenient to provide for a short upper portion extension 18 of the tab 15. The extension 18 is appropriately segment shaped and defined by an arcuate pre-cut line 20. The pre-cut line 20 may also be a weakly serrated line easily breakable by application of a downwardly directed tip pressure from finger F. The upper ends of the serrated lines 17 coincide with the ends of the arcuate line 20. Upon pressing downward on the tab 18, it is caused to bend inwardly along the fold line C thereby affording a convenient edge along which finger pull applied outwardly initiates pulling out of the tab 15 and coincident break of the serrated lines 17.

As the tab 15 gradually moves to its open position, 15a, the egg E follows to a new position E' whereupon it is liberated from the compartment and may be allowed to freely drop into or be captured by the user's hand. Once an egg has been removed from any compartment or cell of the carton, the flap 15 may be folded back into the cell, wherein it is being disposed of and at the same time provides additional end support for the adjacent egg filled cells of the carton.

The provision of extension 18 is a convenient way for facilitating initiation of the opening action but it should be understood that there are other equally effective means for achieving the same purpose without departing from the ambit of the invention. Similarly, it should be understood that the invention is not restricted to its application in relation to any particular type or model of carton such as has been used by way of example only, in the embodiment depicted in the appended drawings.

I claim:

1. An egg carton adapted for singly dispensing eggs contained therein comprising two outer side-walls, a cover between said side-walls, a longitudinal partition between the said side-walls and a plurality of transverse partitions forming a compartment between each transverse partition and the longitudinal partition; for each compartment, a serrated line forming a tear-out area in the side-wall, the said area starting at the upper part of the side-wall and extending down and between two adjacent transverse partitions, means at the upper end of the area for initiating the tearing of the said area, so that the area when outwardly and downwardly pulled provides a temporary resting surface for the egg rolling out of its compartment.

2. An egg carton as recited in claim 1, wherein said initiating means consist of a serrated tab which integrally extends a short distance from the tear-out area in the cover.

3. An egg carton as recited in claim 1, wherein said tear-out area tapers in the direction of the cover to form an inverted horseshoe shape.

4. An egg carton as recited in claim 2, wherein said tab has substantially a semi-circular area.

5. An egg carton as recited in claim 4, wherein the tab is partly surrounded by a curved slit.

References Cited

UNITED STATES PATENTS

| | | | |
|---|---|---|---|
| 2,489,817 | 11/1949 | Rodriguez | 229—29 |
| 3,047,202 | 7/1962 | Schaefer | 229—29 |
| 3,157,344 | 11/1964 | Hennessey | 206—56 |
| 3,185,373 | 5/1965 | Margulies | 206—56 X |
| 3,286,830 | 11/1966 | Robb | 206—56 |
| 3,309,206 | 3/1967 | Daniels | 206—56 |
| 3,315,803 | 4/1967 | Kalajiam | 206—65 |

DAVIS T. MOORHEAD, *Primary Examiner.*